US011955138B2

(12) United States Patent
Srinivas

(10) Patent No.: US 11,955,138 B2
(45) Date of Patent: Apr. 9, 2024

(54) DETECTING VOICE REGIONS IN A NON-STATIONARY NOISY ENVIRONMENT

(71) Applicant: Advanced Micro Devices, Inc., Santa Clara, CA (US)

(72) Inventor: A Srinivas, Hyderabad (IN)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/355,676

(22) Filed: Mar. 15, 2019

(65) Prior Publication Data
US 2020/0294534 A1 Sep. 17, 2020

(51) Int. Cl.
G10L 15/22 (2006.01)
G10L 25/21 (2013.01)
G10L 25/84 (2013.01)
G10L 25/90 (2013.01)

(52) U.S. Cl.
CPC .............. G10L 25/84 (2013.01); G10L 15/22 (2013.01); G10L 25/21 (2013.01); G10L 25/90 (2013.01)

(58) Field of Classification Search
CPC ..... G10L 21/0208; G10L 25/78; G10L 25/93; G10L 15/20; G10L 19/06; G10L 19/07; G10L 21/0316; G10L 19/12; G10L 15/05; G10L 19/18; G10L 2025/786; G10L 2021/02082; G10L 2025/783; G10L 21/0272; G10L 25/21; G10L 25/69; G10L 25/87; G10L 25/90; G10L 13/033; G10L 15/02; G10L 19/00; G10L 19/022; G10L 19/025; G10L 19/03; G10L 19/032; G10L 19/04; G10L 19/107; G10L 19/22; G10L 19/26; G10L 2025/935; G10L 21/0232; G10L 25/84

USPC ....... 704/207, 233, 210, 219, 220, 228, 227, 704/226, 208, 231, 238, 240
See application file for complete search history.

(56) References Cited

U.S. PATENT DOCUMENTS 5,794,188 A * 8/1998 Hollier ................... H04M 1/24
704/228
6,633,841 B1 * 10/2003 Thyssen ................. G10L 19/18
375/242
8,175,291 B2 * 5/2012 Chan ................... G10L 21/0208
381/94.7

(Continued)

OTHER PUBLICATIONS

Wheeler, Bob, "NXP's I.MX RT600 Listens for Less: New Processor Combines MCU and DSP for Audio and AI," The Linley Group Microprocessor Report, 3 pgs., Nov. 26, 2018.

(Continued)

*Primary Examiner* — Vijay B Chawan
(74) *Attorney, Agent, or Firm* — Volpe Koenig

(57) ABSTRACT

Methods, devices, and systems for voice activity detection. An audio signal is received by receiver circuitry. A pitch analysis is performed on the received audio signal by pitch analysis circuitry. A higher-order statistics analysis is performed on the audio signal by statistics analysis circuitry. Logic circuitry determines, based on the pitch analysis and the higher-order statistics analysis, whether the audio signal includes a voice region. The logic circuitry outputs a signal indicating that the audio signal includes voice if the audio signal was determined to include a voice region or indicating that the audio signal does not include voice if the audio signal was determined not to include a voice region.

20 Claims, 6 Drawing Sheets

(56) References Cited

U.S. PATENT DOCUMENTS

| | | | | |
|---|---|---|---|---|
| 8,195,449 | B2* | 6/2012 | Bruhn | H04M 3/2227 |
| | | | | 704/226 |
| 9,047,859 | B2* | 6/2015 | Ravelli | G10L 19/18 |
| | | | | 704/219 |
| 9,078,057 | B2* | 7/2015 | Yu | H04R 3/005 |
| 9,208,780 | B2* | 12/2015 | Fujimoto | G10L 15/20 |
| 9,305,567 | B2* | 4/2016 | Visser | G10L 21/0208 |
| 9,311,926 | B2* | 4/2016 | Sung | G10L 19/06 |
| 9,536,523 | B2* | 1/2017 | Bakish | G10L 15/24 |
| 9,536,540 | B2* | 1/2017 | Avendano | G10L 21/0272 |
| 10,580,425 | B2* | 3/2020 | Sung | G10L 19/06 |
| 2006/0106603 | A1* | 5/2006 | Boillot | G10L 21/0364 |
| | | | | 704/238 |
| 2008/0082320 | A1* | 4/2008 | Popa | G10L 13/033 |
| | | | | 704/201 |
| 2009/0018825 | A1* | 1/2009 | Bruhn | G10L 25/69 |
| | | | | 704/E19.002 |
| 2009/0164212 | A1* | 6/2009 | Chan | G10L 21/0208 |
| | | | | 704/226 |
| 2009/0281797 | A1* | 11/2009 | Zopf | G10L 19/005 |
| | | | | 704/207 |
| 2011/0004469 | A1* | 1/2011 | Sato | G10L 19/07 |
| | | | | 704/223 |
| 2011/0016077 | A1* | 1/2011 | Vasilache | G10L 25/78 |
| | | | | 706/54 |
| 2013/0282367 | A1* | 10/2013 | Wang | G10L 25/78 |
| | | | | 704/210 |
| 2013/0282372 | A1* | 10/2013 | Visser | G10L 15/20 |
| | | | | 704/233 |
| 2013/0282373 | A1* | 10/2013 | Visser | G10L 21/0316 |
| | | | | 704/233 |
| 2014/0337020 | A1* | 11/2014 | Wang | G10L 25/93 |
| | | | | 704/210 |
| 2017/0278527 | A1* | 9/2017 | Sharma | G10L 19/0018 |
| 2019/0019524 | A1* | 1/2019 | Sung | G10L 25/15 |
| 2019/0108837 | A1* | 4/2019 | Christoph | G10L 25/84 |
| 2019/0298271 | A1* | 10/2019 | Zigel | A61B 5/4818 |
| 2019/0341026 | A1* | 11/2019 | Visser | G10L 15/22 |

OTHER PUBLICATIONS

International Telecommunication Union, "Series G: Transmission Systems and Media, Digital Systems and Networks; Digital terminal equipments—Coding of voice and audio signals," Recommendation of ITU-T G.729, 152 pgs, Jun. 2012.

* cited by examiner

DETECTING VOICE REGIONS IN A NON-STATIONARY NOISY ENVIRONMENT

BACKGROUND

In typical audio capture scenarios, such as voice capture, a microphone receives an audio signal that includes several different types of signals, either concurrently, or at different points in time. In some cases, the signals include a desired voice signal, ambient noise, and/or other non-stationary signals such as music and microphone noise. The voice signal included in the captured audio signal can be referred to as a voice region. Noise, music, or other signals included in the captured audio signal can be referred to as noise regions, music regions, or other regions. The detection of voice regions in a given signal can be referred to as voice activity detection (VAD).

BRIEF DESCRIPTION OF THE DRAWINGS

A more detailed understanding can be had from the following description, given by way of example in conjunction with the accompanying drawings wherein.

DETAILED DESCRIPTION

Some implementations provide methods, devices, and/or systems for voice activity detection. An audio signal is received by receiver circuitry. A pitch analysis is performed on the received audio signal by pitch analysis circuitry. A higher-order statistics analysis is performed on the audio signal by statistics analysis circuitry. Logic circuitry determines, based on the pitch analysis and the higher-order statistics analysis, whether the audio signal includes a voice region. The logic circuitry outputs a signal indicating that the audio signal includes voice if the audio signal was determined to include a voice region or indicating that the audio signal does not include voice if the audio signal was determined not to include a voice region.

Figure 1:
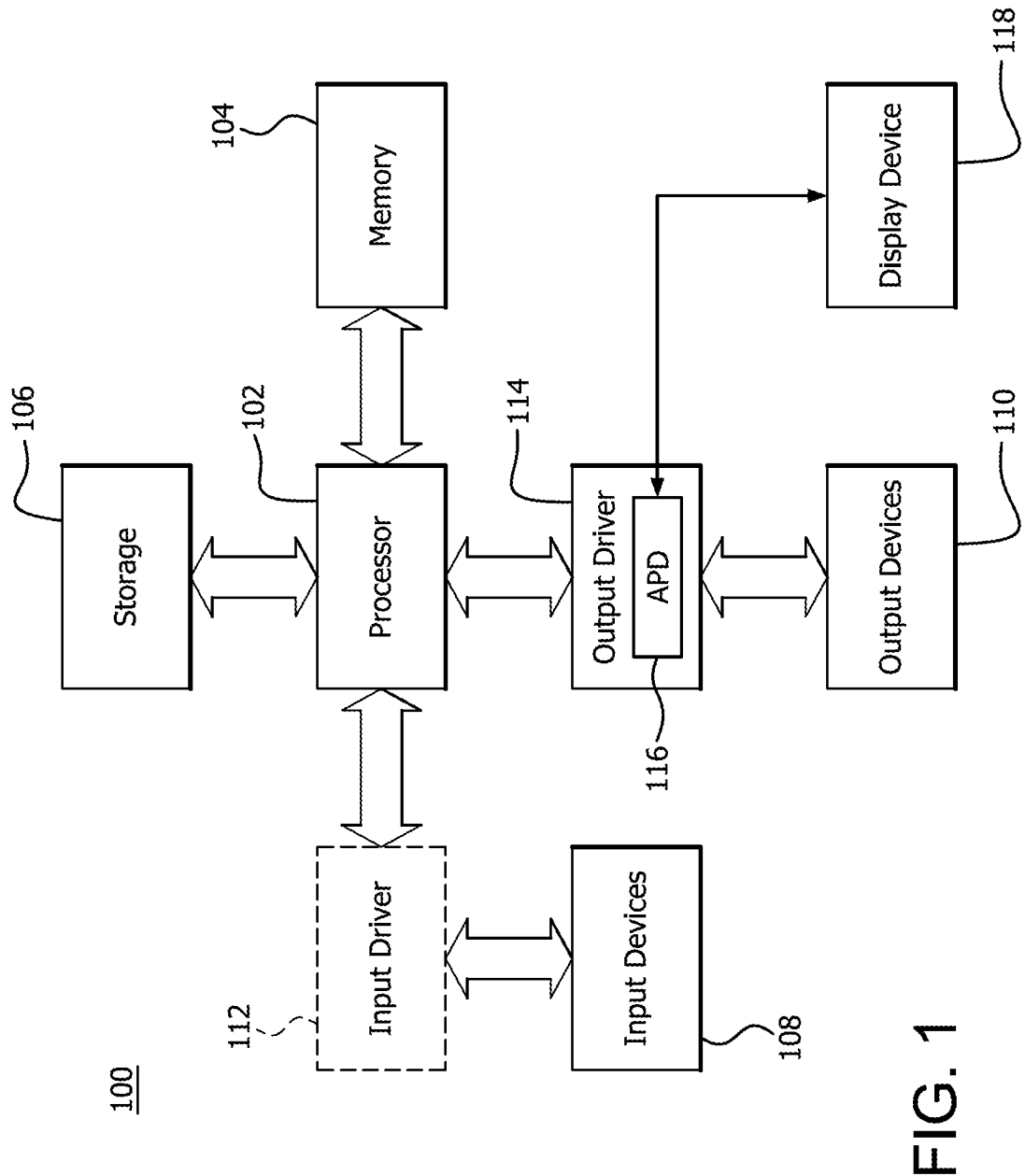
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and to provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
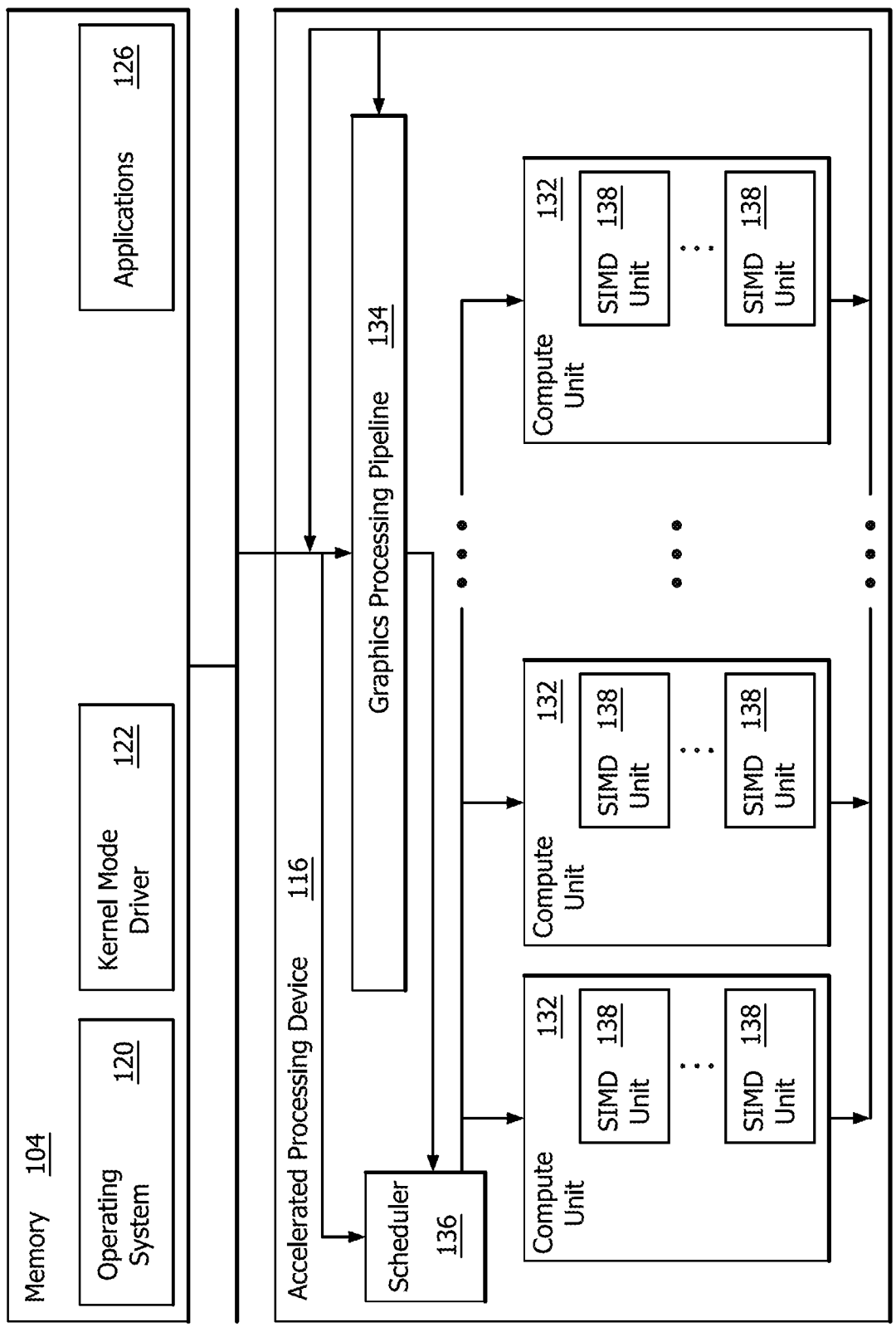
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

In various audio capture scenarios it is desirable to process or otherwise identify a voice signal (or other type of signal) from a noisy audio signal. For example, in an interactive scenario, such as a user interaction with a personal voice assistant, overall end-user experience is negatively impacted in some cases if a keyword or key-phrase is not properly detected due to a noisy environment.

In some cases it is desirable to detect voice regions within the captured audio, e.g., in order to properly process a desired voice signal from a noisy captured audio signal.

From an end-user perspective, in some cases, voice captured by a microphone should include only the voice signal, and not include other unwanted ambient artefacts. To remove unwanted components in capture signal, various types of audio (e.g., speech) processing techniques and devices are employed. Some example devices include beamformers (e.g., in a multiple microphone "multi-mic" scenario), noise suppressors, acoustic echo cancellers, automatic gain controllers, and so forth. Such devices are implemented using a digital signal processor (DSP) or other suitable hardware.

Some audio processing devices classify different signals within a captured audio signal (which can be referred to as underlying signals) into different regions. For example, in some implementations, a captured audio signal includes one or more underlying voice signals, noise signals, music signals, or other signals. In some implementations, audio processing devices classify these underlying signals as voice regions, noise regions, music regions, or other regions. In some implementations, voice signals are continuous realtime voice streams. In some implementations, a voice region is a part of a voice signal.

Existing audio and/or speech processing algorithms are clock and power intensive. In other words, they consume relatively large amounts of power, and/or take a relatively large number of clock cycles to complete. A processor (e.g., a digital signal processor (DSP) targeted for speech processing applications) consumes larger amounts of power as it operates at higher clock frequencies. To minimize or reduce such power consumption (e.g., to improve battery life), in some implementations, it is desirable to enable internal speech processing algorithms only when a voice is present in an incoming captured data signal. In general, it is desirable to invoke such audio processing devices in a manner which manages or minimizes the power and clock utilization.

If a region is misclassified (e.g., voice is classified as a noise region, or noise is classified as a voice region), VAD decision-dependent speech processing is adversely affected in some cases. For example, if noise within a captured audio signal is misclassified as a voice region, circuitry for analyzing audio data is engaged, resulting in improper functioning of the speech processing algorithm and/or wasted power and clock cycles.

Figure 3:
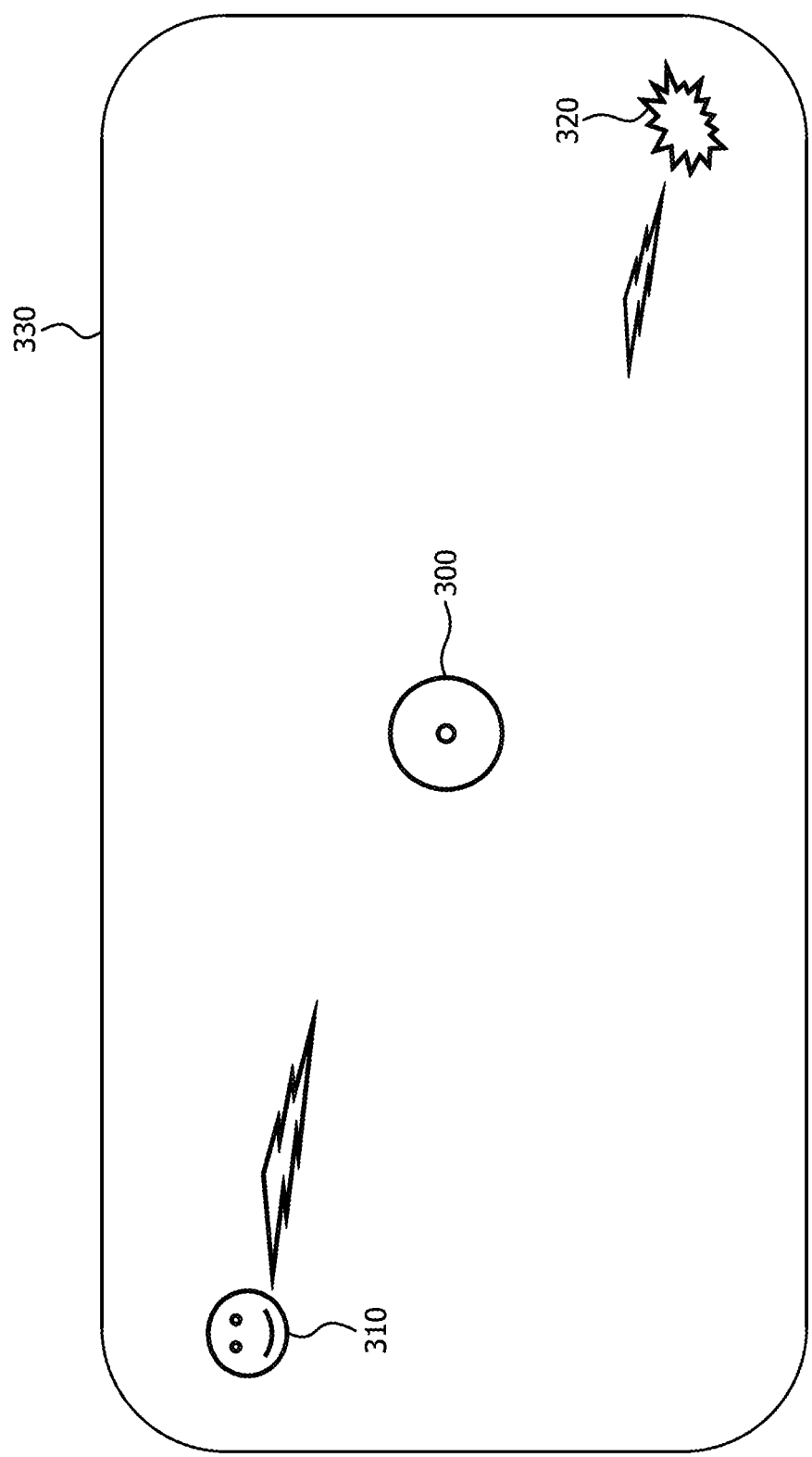
FIG. 3 is a plan view of an example audio capture scenario.

FIG. 3 is a plan view of an example audio capture scenario, including audio capture device 300, voice source 310, and noise source 320. In this example, audio capture device 300 is a microphone (e.g., as input device 108 shown and described with respect to FIG. 1), however any other suitable audio capture device is usable in other audio capture scenarios. Voice source 310 is a human speaker in this example, however any other suitable voice source (e.g., recorded voice, loudspeaker, etc.) is usable in other audio capture scenarios. Noise source 320 represents ambient noise in the environment 330, however other noise sources can be present in the environment in other audio capture scenarios, such as a localized noise source (jackhammer, etc.) equipment noise or hum (e.g., 60 cycle hum in microphone 300 or attached circuitry, etc.).

In the example of FIG. 3, microphone 300 captures a noisy audio signal from the environment 330. The noisy audio signal includes a voice signal from voice source 310 and a noise signal from noise source 320. The captured audio signal is input into a suitable processing device (e.g., processor 102, via input device 108, as shown and described with respect to FIG. 1) for VAD. The processing device classifies voice and noise regions as further discussed herein.

Existing approaches to VAD suffer from various deficiencies. For example, some VAD decisions based on zero crossing detectors based on signal energies are error prone, e.g., in the case of music regions, and low signal to noise ratio (SNR) regions. Some VAD decisions based on the International Telecommunications Union (ITU) G.729 standard are biased towards voice regions. In other words, in ambiguous cases, G.729 VAD classifies a noise region as voice, which has the disadvantage of activating VAD dependent speech hardware and/or algorithms unnecessarily for audio signals that do not include voice. In some cases this produces improper outputs and consumes excess power.

Some VAD decisions based on formant shape tracking or linear prediction (LP) coefficients alone for voice region detections are error prone for music and tonal signals. Some VAD decisions based on cepstral analysis techniques use a noise code-book to differentiate between voice and non-voice regions. The term cepstral refers to a particular type of speech signal representation. The cepstrum of a signal is a representation of its spectrum (in the frequency domain) in another domain (i.e., the quefrency domain). Said another way, the term cepstral in the quefrency domain relates to the term spectral in frequency domain. Some ways of determining a cepstrum include applying an inverse Fourier transform to the logarithm of an estimated spectrum of a signal. In some cases, generation of a noise code-book is disadvantageously inaccurate, as well as memory and clock intensive. Some VAD decisions based on artificial neural network (ANN) techniques use classifiers based on a pre-loaded noise model, or estimate a noise model in real time, which are clock and memory intensive.

Various existing approaches result in misclassification of voice regions in music, tonal and lower SNR regions in some circumstances, yielding undesirably high memory, power, and clock requirements. Accordingly, various systems methods, and devices discussed herein provide more accurate detection of voice regions, activate VAD dependent speech processing modules only during voice regions, maintain an inactive, "sleep" or otherwise disengaged, off, or low-power state of VAD dependent speech processing modules during non-voice regions. In some cases, such approaches have the advantage of keeping relevant processing hardware (e.g., DSP) in an off or low-power state and/or lower clock rate for non-voice regions.

To detect voice regions in a captured audio signal, some implementations provide voice detection circuitry to detect voice regions based on an analysis of the captured audio signal for both fundamental characteristics of speech and higher order statistics of an LP residual.

In order to analyze the captured audio signal for fundamental characteristics of speech, some implementations track pitch (e.g., the fundamental frequency) and its corresponding harmonics in the captured signal to determine whether they match or otherwise correspond to a human voice (e.g., articulation characteristics of a human voice). If this is found to be the case, then the corresponding input frame is classified as a voiced region in some implementations, or this determination is further analyzed.

In some implementations, the pitch or fundamental frequency for males is characterized to be within a certain range, such as 85-180 Hertz, or approximately 85-180 Hertz, the pitch or fundamental frequency for females is characterized to be within a certain range, such as 165-250 Hertz, or approximately 165-250 Hertz, and the pitch or fundamental frequency for children is characterized to be within a certain range, such as 250-650 Hertz, or approximately 250-650 Hertz. Accordingly, some implementations distinguish a human voice from noise and/or music based on (e.g., partly based on) whether it falls into one or more such pitch ranges. In some implementations, energy in each of several individual pitch harmonic bands is estimated. Variance of energy in each of the pitch harmonics is tracked or estimated for a specified number of frames and is characterized to be of a certain variance or range of Variances, or lesser (or relatively less) for a human voice and within a certain Variance, or range of Variances, or greater (or relatively greater) for music or noise. Accordingly, some implementations distinguish a human voice from noise and/or music based on Variance of energy across each pitch harmonic band.

In order to analyze the captured audio signal for higher order statistics of an LP residual, some implementations characterize second and fourth order moments, i.e., Variance and Kurtosis, of the LP residual as providing distinguishing information, e.g., for noise and music regions. For example, in some implementations, Kurtosis is characterized as within a certain range, above a certain threshold, or higher (or relatively higher) for voice regions, and within a certain range, or below a certain threshold, or lower (or relatively lower) for unvoiced/music regions. An unvoiced region broadly refers to music, noise, and nasal sounds. In some implementations, Variance is characterized as within a certain range, above a certain threshold, or higher (or relatively higher for voice regions, and within a certain range, or below a certain threshold, or lower (or relatively lower) for noise alone regions. In this context, a noise-alone region does not include voice. It is noted that thresholds are described with respect to a certain sign (e.g., above or below a positive threshold) for ease of description, however any suitable thresholding is usable in other examples (e.g., a negative threshold and/or e.g., replacing above with below, etc.)

Based on the forgoing, some implementations analyze the captured audio signal for fundamental characteristics of speech to detect the presence of a voice region, and analyze higher order statistics of the captured audio signal to confirm the presence of the detected voice region. In some implementations, analysis for higher audio statistics also detects noise and/or music regions. In some implementations, these analyses are combined, e.g., using decision logic, to detect voiced content (e.g., a voice region) in an input audio signal.

Figure 4:
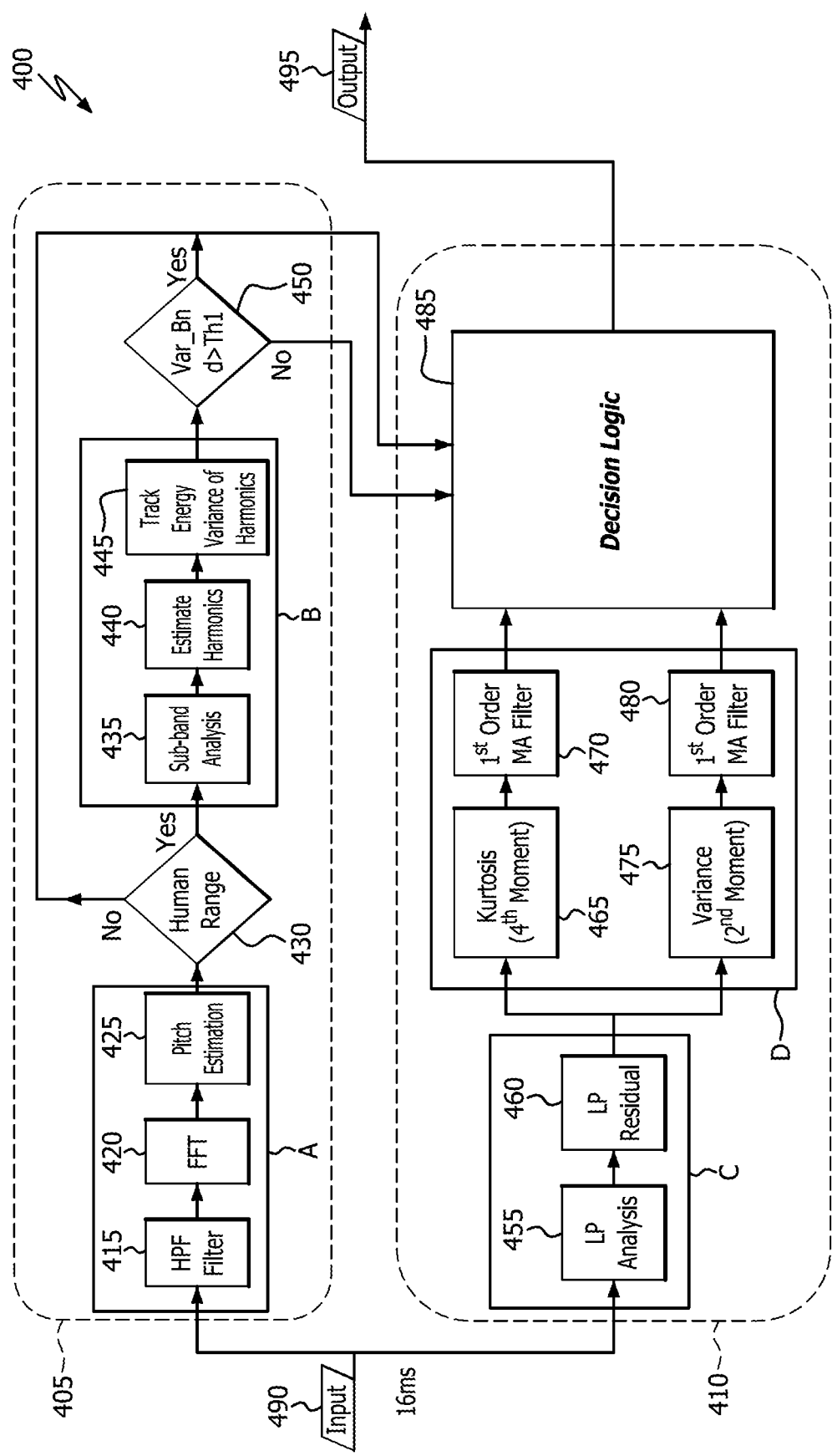
FIG. 4 is a flow chart illustrating example operation of an example voice region detector.

FIG. 4 is a flow chart illustrating operation of an example voice region detector 400. Conceptually, detector 400 is described with respect to a fundamental characteristics analyzer 405 and a higher order statistics analyzer 410, however this is only for ease of description and it is noted that various implementations are not necessarily implemented in separate parts, or divided in this way. In this example, voice region detector 400 is implemented using processor 102 as shown and described with respect to FIG. 1, however any suitable processing device (e.g., DSP, application-specific integrated circuit (ASIC), etc.) is usable in other implementations.

As a general overview, fundamental characteristics analyzer 405 inputs sampled audio data 490 and analyzes it based on fundamental characteristics of speech to determine whether the sampled audio data 490 does not include a voice region, or potentially includes a voice region. In some implementations, fundamental characteristics analyzer 405 either excludes, or does not exclude, the possibility that the sampled audio data 490 includes a voice region. Higher order statistics analyzer 410 inputs the same sampled audio data 490 and analyzes it based on higher order statistics of a LP residual to determine whether the sampled audio data determined by fundamental characteristics analyzer 405 to potentially include a voice region, in fact includes a voice region. In some implementations, higher order statistics analyzer 410 either confirms a potential voice region, or excludes the potential voice region.

In more detail, fundamental characteristics analyzer 405 includes a pitch estimator A, and a sub-band analyzer B. These groupings of elements are for ease of description, and other implementations omit such groupings. The various elements are also organized for ease of description, and other implementations combine, separate, omit, or rearrange various elements in a suitable manner.

In pitch estimator A, the fundamental characteristics analyzer 405 inputs sampled audio data 490 to a high-pass filter (HPF) 415. In this example, sampled audio data 490 is generated by sampling a microphone input at a particular sampling rate, and is read frame-wise into HPF filter 415. The sampling rate in this example is 16,000 Hertz, which is split into 16 millisecond frames. This yields 256 samples per frame, which are input into HPF filter 415. Any suitable sampling rate and/or frame size can be used. High-pass filter 415 includes any suitable hardware and/or software for filtering the sampled audio data 490 to remove a low frequency component. In this example, high-pass filter 415 is a generalized high-pass filter circuit with a cutoff at 70 Hertz.

The high-pass filtered data output from HPF 415 is input to a fast Fourier transformer 420 which applies a fast Fourier transform (FFT) to the high-pass filtered data. Fourier transformer 420 can include any suitable hardware and/or software transformer. The FFT is used to convert the input time domain data into the frequency domain. In this example, the frequency domain data, which can be referred to as a spectrum, is used to estimate the pitch frequency and estimate the energy in each of the pitch harmonic bands. In some implementations, fast Fourier transformer 420 also includes an inverse FFT (IFFT) operation, e.g., per Equation 4, below. The transformed filtered data is input to pitch estimator 425, which estimates the fundamental pitch of the transformed filtered data. In this example, pitch estimator 425 estimates the pitch using an auto-correlator, however any suitable pitch estimation hardware and/or software can be used. In order to estimate the fundamental pitch, the auto-correlator identifies the peak frequency of the captured signal for the particular frame being analyzed.

The peak frequency is compared with various human pitch ranges by a human range comparator 430, and a determination of whether or not the peak frequency lies within a human pitch range is input to sub band analyzer B and decision logic 485. The sampled audio data 490 is also input to the sub-band analyzer B.

In sub-band analyzer B, the fundamental characteristics analyzer 405 inputs the magnitude spectrum output from FFT block 420 to a sub-band analyzer 435. Sub-band analyzer 435 includes any suitable hardware and/or software for dividing the magnitude spectrum 420 into non-overlapping frequency bands. In this example, magnitude spectrum 420 is divided into 6 non-overlapping frequency bands of equal width; however the magnitude spectrum 420 can be divided into any suitable number of bands and bandwidths in other implementations. Each of the frequency bands is input to harmonics estimator 440, which estimates the energies of pitch harmonics for each band. In this example, the bandwidth of each of the bands is 375 Hertz, however any suitable bandwidth can be used. The energies of the pitch harmonics are input to Variance tracker 445, which tracks the energy Variance of the pitch harmonics. In this example, the Variance tracker 445 tracks the energy variance of the pitch harmonics for 5 frames, however tracking can be performed for any suitable number of frames or length of time in other implementations. Any suitable hardware and/or software can be used to track the energy Variance of the pitch harmonics for each of the harmonic bands.

The energy Variance of the pitch harmonics is compared with a threshold, Th1, by a Variance comparator 450. In some implementations, only the band with the highest variance is compared with Th1. In some implementations, the two bands with the highest variances are compared with Th1. Any suitable permutation of comparisons is possible in this regard. This is in accordance with the observation, discussed earlier, that a human voice has relatively lower variance across pitch harmonic energies as compared with noise. Accordingly, a suitable value of Th1 which reflects this is used. In this example, Th1 has a value of 0.00001. In some implementations, separate thresholds are used for short-term and long-term variance, e.g., as discussed below with respect to Equations 19a, 19b, and 20. A determination of whether or not the energy Variance exceeds Th1 is input to decision logic 485.

Higher order statistics analyzer 410 includes a LP residue analyzer C, and a higher-order statistics estimator D. These groupings of elements are for ease of description in this example, and other implementations can use other groupings, or omit such groupings. The various elements are also organized for ease of description, and other implementations can combine, separate, omit, or rearrange various elements in a suitable manner.

In LP residue analyzer C, the higher order statistics analyzer 410 inputs sampled audio data 490 to LP analyzer 455. In this example, sampled audio data 490 is the same input supplied to fundamental characteristics analyzer 405, and the various operations of higher order statistics analyzer 410 and fundamental characteristics analyzer 405 occur in parallel (e.g., over the same time period, or overlapping time periods). In some implementations, the operations do not occur in parallel. LP analyzer 455 includes any suitable hardware and/or software configured to determine LP coefficients based on sampled audio data 490. In this example, the LP coefficients are determined using Levinson-Durbin recursion.

The LP coefficients are input to LP residue analyzer 460. LP residue analyzer 460 includes any suitable hardware and/or software to determine an LP residual based on the LP coefficients. In this example, LP residue analyzer 460 includes a linear prediction coefficient based finite impulse response (FIR) filter. The FIR filter suppresses speech formant information in the input signal and outputs an LP residual.

In some implementations, LP coefficients are estimated in LP analyzer 455, and the LP residual is estimated in LP residue analyzer 460, however, as with other units described herein, it is noted that these blocks can be implemented as a single unit.

In higher-order statistics estimator D, the LP residual calculated in LP residue analyzer C is input to a Kurtosis analyzer 465 and a variance analyzer 475. Kurtosis analyzer 465 determines or estimates $4^{th}$ order moments of the input LP residual. Variance analyzer 475 determines or estimates $2^{nd}$ order moments of the input LP residual. Kurtosis analyzer 465 and Variance analyzer 475 include any suitable hardware and/or software to determine or estimate $4^{th}$ order moments and $2^{nd}$ order moments respectively.

It is noted that in some implementations $4^{th}$ order moments provide information useful for differentiating music regions from voice or noise regions, and $2^{nd}$ order moments provide information useful for differentiating noise regions from voice or music regions.

The output $4^{th}$ order moments and $2^{nd}$ order moments are input to $1^{st}$ order moving average (MA) filters 470 and 480 respectively. In this example, MA filters 470 and 480 remove intermittent spikes in Variance and Kurtosis estimates. Such spikes arise, e.g., due to the frame size. MA filters 470 and 480 include any suitable hardware and/or software for MA filtering the determined or estimated variance and kurtosis.

The MA filtered determined or estimated Kurtosis and Variance are input to decision logic 485, which compares these metrics to thresholds in order to confirm what types of regions are included within sampled audio data 490. In this way, the higher order statistics analyzer 410 can be said to "tune" the determination of the fundamental characteristics analyzer 405. In this example, the MA filtered Kurtosis is compared with a threshold Th2, and the MA filtered variance is compared with a threshold Th3. The output of Variance comparator 450, indicating the Variance of the pitch harmonics, is also input to decision logic 485.

The Table 1 is a truth table illustrating example output of decision logic 485 based on the inputs, where T1=0 if the Variance of the pitch harmonics exceeds Th1 (T1=1 otherwise), T2=1 if the Kurtosis ($4^{th}$ moment) exceeds the second threshold Th2 (T2=0 otherwise), and T3=0 if the Variance ($2^{nd}$ moment) exceeds the third threshold Th3 (T3=1 otherwise). It is noted that the logical convention used in this table is for ease of description only; any sign or convention can be used for thresholding in other examples.

TABLE 1

| T1 | T2 | T3 | Result |
|---|---|---|---|
| 0 | 0 | 0 | Noise + Music |
| 0 | 0 | 1 | Music region (No Noise) |
| 0 | 1 | 0 | Noisy Region (Only Noise) |
| 0 | 1 | 1 | Voice alone region (No Background) |
| 1 | 0 | 0 | Voice + Background (Noise + Music) |
| 1 | 0 | 1 | Voice + Background (Music) |
| 1 | 1 | 0 | Voice + Background (Noise) |
| 1 | 1 | 1 | Voice alone region (no Background) |

In Table 1, voice regions are identified as present or not present within the input audio data. In some cases, noise regions and/or music regions are identified as present in the input audio data.

Example bases and elaborations on the various techniques used in detecting voice regions, e.g., as shown and described with respect to various components of example voice region detector 400, are described below.

In some implementations, audio data input to a voice detection process is pre-processed in various ways. For example, in the following, $ip^k$ denotes the captured $k^{th}$ frame of data captured by a digital microphone. In some cases, the microphone may introduce various unwanted characteristics, such as DC (e.g., quantization error) and spurious low frequency components in input data $ip^k$. Such components are filtered by a pre-processing module in some implementations. An example pre-processing module is a high pass filter h with a cutoff 70 Hz (e.g., HPF 415), which is illustrated as follows:

$$ip^k = h * ip^k \qquad \text{Equation 1a}$$

After high pass filtering of the input signal, it is windowed by a hamming window in some implementations:

$$ip^k = hamm * ip^k \qquad \text{Equation 1b}$$

An automatic level controller (ALC) is used in pre-processing in some implementations, which adjusts the input data level to a pre-configured level. An ALC aids voice region detection by alienating the algorithm performance from input digital microphone capture dynamic range. Here, the term alienation indicates making detection performance of the VAD algorithm independent of the dynamic ranges of different types of digital microphones. This can have the advantage of avoiding the need to re-tune aspects of the approaches discussed herein for different dynamic ranges of different digital microphones.

In some implementations, the underlying pitch frequency of the captured signal (e.g., as pre-processed) is estimated (e.g., pitch estimator A). Some implementations estimate the pitch using a generalized auto-correlation based technique. The pitch is processed to identify the peak frequency in power spectral density. In some implementations, this processing is frame based (e.g., using a frame size of 48 milliseconds). Estimated pitch frequency is validated for its presence in human pitch range i.e., (pitch or fundamental frequency for males is around 85-180 Hz, females is around 165-250 Hz, and children is around 250-650 Hz), sub band analysis is done to confirm presence of voice activity.

Autocorrelation exploits the fact that a periodic signal will be similar from one period to the next. The first peak in the autocorrelation $R_{ip}$ indicates the period of the waveform. In some implementations, the pitch estimator needs N (e.g., at least 48 milliseconds) to detect pitch. The pitch estimator buffers three frames (e.g., 3*16 milliseconds) of input data to estimate pitch, $$R_{ip}(l) = \frac{1}{(N-1)} \sum_{i=l}^{N-1} ip^k(i) ip(i-l) \; \{l \text{ is the lag}\} \qquad \text{Equation 2}$$

$$IP^k = FFT(ip^k) \qquad \text{Equation 3}$$

$$R_{ip}(l) = IFFT(IP^k * conj(IP^k)) \qquad \text{Equation 4}$$

Here, $R_{ip}$ indicates the maximum peak in the auto-correlation sequence. $R_{ip}$ is determined by searching between the periods of human voice (i.e., 2 milliseconds and 16 milliseconds, in the time domain), and the pitch is estimated as the location of the first maximum peak. In some implementations, pitch frequency is estimated in the frequency domain using a FFT, e.g., to minimize or reduce calculations and compute cycles.

In some implementations, a sub-band analyzer (e.g., sub-band analyzer B) tracks the variance in energy of the pitch harmonics of an input spectrum. In some implementations, the input signal spectrum is estimated by taking an N-point FFT of the input signal:

$$IP^k = FFT(ip^k); \quad \text{Equation 5}$$

A normalized power spectral density (NPSD) of the input spectrum is calculated as follows:

$$PSD^k = \frac{(IP^k)^2}{N}; \quad \text{Equation 6}$$

$PSD^k$ indicates the NPSD in the equations herein, and is considered for the frequency band BW. BW, as defined below, is selected to correspond to the human voice frequency range in some implementations. It is noted that any suitable frequency band values can be used. The NPSD in bandwidth BW is further divided into harmonic frequency bands (HFB). In the example shown in Equation 8, the HFBs are non-overlapping, and each of equal band-width. Specifically, six non-overlapping HFBs each having a band-width of 375 Hz are used in this example, however any suitable arrangement of sub-bands can be used. Each of the six example sub-bands includes 12 frequency bins. The energy in each harmonic band is calculated by summing the PSD value of all frequency bins in that band.

$$BW = [0 \text{ Hz}, BW_h]; \quad \{\text{where } BW_h = 4500 \text{ Hz}\} \quad \text{Equation 7}$$

$$NPSD_i^k = \sum_{j=1+p}^{p+\frac{BW_h}{12}} PSD^k(j) \quad \left\{\left(\forall\, p = (i-1) * \frac{BW_h}{12}\right)\right\} \quad \text{Equation 8}$$

After estimating the energy in all HFBs, energy variance, hfbvar, across several past frames of each HFB is calculated. In this example, energy variance is calculated across 5 past frames of each HFB, however any suitable number of frames is usable in other implementations:

$$hfbvar_i^k = var(NPSD_i^{k-5}, \ldots NPSD_i^k) \quad \text{Equation 9}$$

As discussed earlier, some implementations, variance across pitch harmonics is characterized to be of a certain variance or range of variances, or lesser (or relatively less) for a human voice and within a certain variance, or range of variances, or greater (or relatively greater) for music or noise. Accordingly, some implementations distinguish a human voice from noise and/or music based on Variance across pitch harmonics. Accordingly, in some implementations:

$$FT_{dsn}^1 = \begin{cases} 0; & \{hfbvar_i^k \geq ft_{th}^1\} \\ 1; & \{hfbvar_i^k < ft_{th}^1;\ ft_{th}^1 = 0.00001\} \end{cases} \quad \text{Equation 10}$$

Here, $FT_{dsn}^1$, indicates the decision made by thresholding the energy variances. An example of this is the output of Variance comparator 450 in FIG. 4. This decision can be referred to as a primary voice region indicator. In this example, variance threshold $ft_{th}^1$ is derived experimentally; however in some implementations the variance threshold is iteratively estimatable as a soft threshold value, e.g., dynamically during operation.

In some implementations, a LP residue analyzer (e.g., LP residue analyzer C) estimates an LP residual of the input signal. In this example, the LP residual is output from a LPC based FIR filter, which suppresses speech formant information in the input signal. Here, $p^{th}$ order LPC coefficients are estimated using an autoregressive (AR) modeling autocorrelation method, however any suitable estimation technique is usable in other implementations. LPC modeling in this way reflects estimation of a current speech sample by a linear combination of the past p samples:

$$\overline{ip}(j) = \sum_{i=1}^{p} \alpha_i * ip(j-i) \quad \text{Equation 11}$$

Here, $\alpha_i$ are the linear prediction coefficients. For an exact prediction of ip(j), the input signal at time j, p would need to be $\infty$, which is practically impossible. In this example a value of p=10 is used to estimate ip(j), however any suitable value is usable in other implementations. The value 10 is used in this implementation due to its relative stability in some implementations. Using a non-infinite value results in error e(j) between the actual and estimated values of ip(j):

$$e(j) = ip(j) - \overline{ip}(j); \quad \text{Equation 12a}$$

$$e(j) = ip(j) - \sum_{i=1}^{p} \alpha_i * ip(j-i) \quad \text{Equation 12b}$$

Solving Eq 12b to minimize error, in the least square sense, solves for the LPC coefficients.

$$E = \sum_j e^2(j); \quad \text{Equation 13a}$$

$$E = \sum_j \left[ip(j) - \sum_{i=1}^{p} \alpha_i * ip(j-i)\right]^2; \quad \text{Equation 13b}$$

Solving for LPC coefficients, we set the partial differentiation of E with respect to $\alpha_i$ equal to zero, resulting in p equations in p unknowns. In this example, p=10. Rewriting these equations:

$$R_j = \sum_{i=1}^{p} \alpha_i * \left[\sum_j ip(j-i) * ip(j-k)\right]; \quad \text{Equation 14}$$

The equations represented by Equation 14 are referred to as AR equations, and are solved using Levinson-Durbin recursion. A FIR filter $h_{lp}$ is constructed with the estimated LP coefficients. The FIR filter is used to filter the input signal $ip^k$ to estimate the LP residual, lpres.

$$lpres^k = h_{lp} * ip^k; \quad \text{Equation 15}$$

Analyzing the LP Residual results in information usable to classify an input captured signal into voice or music or noise regions.

In some implementations, a higher order of statistics (HOS) estimator (e.g., higher-order statistics estimator D) calculates $2^{nd}$ order (variance) and $4^{th}$ order (Kurtosis) moments of the LP residual (e.g., using variance analyzer 475 and Kurtosis analyzer 465). In this example, the $2^{nd}$ order and $4^{th}$ order moments are used, e.g., because they provide information for differentiating regions in noisy capture signals as discussed earlier. In this example, variance, $var^k$, is calculated as:

$$var^k = \frac{1}{N} \sum_{i=1}^{N} (lpres^k(i) - \mu)^2; \qquad \text{Equation 16}$$

where $\mu$ is the mean of $lpres^k$

Kurtosis $krts^k$ for the $k^{th}$ frame is calculated as:

$$krts^k = \frac{\frac{1}{N}\sum_{i=1}^{N}(lpres^k(i)-\mu)^4}{\left(\frac{1}{N}\sum_{i=1}^{N}(lpres^k(i)-\mu)^2\right)^2}; \qquad \text{Equation 17}$$

where $\mu$ is the mean of $lpres^k$

In this example, the variance provides information used to detect noise regions, and Kurtosis provides information used to detect music regions. In general, as further described earlier, variance is greater for voiced regions, and lesser for noise alone regions. Kurtosis is greater for voiced regions, and lesser for unvoiced and/or music regions.

The estimated variance and Kurtosis are each smoothed using a 1st order moving average (MA) filter (e.g., MA filters 470, 480) in some implementations. The filter removes sudden intermittent spikes in Variance and Kurtosis estimates which may arise due to small frame sizes (e.g., 16ms in this example). The following illustrates an example calculation of the moving average smoothed Variance ma_var$^k$ and Kurtosis ma_krts$^k$ for the $k^{th}$ frame:

$$ma\_var^k = (ma\_var^{k-1} * \beta + (1-\beta) * var^k); \qquad \text{Equation 18a}$$

$$\text{wherein } \beta = \begin{cases} 0.1; & \{ma\_var^{k-1} > var^k\} \\ 0.8; & \{\text{otherwise}\} \end{cases}$$

$$ma\_krts^k = (ma\_krts^{k-1} * \beta + (1-\beta) * krts^k); \qquad \text{Equation 18b}$$

$$\text{wherein } \beta = \begin{cases} 0.64; & \{ma\_krts^{k-1} > krts^k\} \\ 0.8; & \{\text{otherwise}\} \end{cases}$$

The values of $\beta$ in these equations are experimentally derived weighting terms used for smoothing. This weighting may be omitted, or any suitable values can be used in other implementations. In some implementations, the variance is further smoothened by an infinite impulse response (IIR) filter to estimate long-term variance ma_var_lt$^k$ from short term variance ma_var_st$^k$:

$$ma\_var\_st^k = ma\_var^k; \qquad \text{Equation 19a}$$

$$ma\_var\_lt^k = (1-\beta) * ma\_var\_st^t + (\beta) * ma\_var\_lt^{k-1}; \qquad \text{Equation 19b}$$

$$\text{wherein } \beta = \begin{cases} 0.1; & \{lt\_var\_cntr < 15\} \\ 0.99; & \{lt\_var\_cntr = 0\} \end{cases}$$

The values of $\beta$ in this equation are experimentally derived weighting terms used to yield faster updating for the first 15 frames, and slower updating after the first 15 frames. lt_var_cntr is a variable to track the frame count. This weighting may be omitted, or any suitable values can be used in other implementations. In some implementations, decision logic is used to detect voice regions based on the smoothed HOS estimates discussed earlier. In this example, voice regions are detected based on variance as:

$$FT^2_{var\_dsn} = \begin{cases} 1; & \begin{cases} (ma\_var\_lt^k > ft^2_{var\_th2}) \\ (ma\_var\_st^k > ft^2_{var\_th2}) \\ \{ma\_var\_st^k \geq (ft^2_{var\_th1} * ma\_var\_lt^k)\} \end{cases} \\ 0; & \{\text{otherwise}\} \end{cases} \qquad \text{Equation 20}$$

Where wherein $ft^2_{var\_th1} = 1.1$ & $ft^2_{var\_th2\_} = 0.00001$

Here, $FT_{var\_dsn}^2$ indicates the decision made by the variance analysis. In this expression, ma_var_lt$^k$ refers to the $k^{th}$ frame moving average estimation of the long term value of Variance, ma_var_st$^k$ refers to the $k^{th}$ frame moving estimation of the short term value of Variance. ft$_{var\_th1}^2$ and ft$_{var\_th2}^2$ are experimentally derived thresholds in this example, although any suitable thresholds are usable in other implementations. In some implementations, Kurtosis is further smoothed using a dual alpha IIR filter to estimate short term Kurtosis and long-term Kurtosis:

$$ma\_krts\_st^k = ma\_krts^k; \qquad \text{Equation 21a}$$

$$ma\_krts\_lt^k = \begin{cases} (1-\beta) * ma\_krts\_st^k + (\beta) * ma\_krts\_lt^{k-1}; & \{\beta == 0.1\} \\ (\beta - 1) * ma\_krts\_st^k + (\beta) * ma\_krts\_lt^{k-1}; & \{\beta == 0.99\} \end{cases} \qquad \text{Equation 21b}$$

$$\text{wherein } \beta = \begin{cases} 0.1; & \{lt\_krts\_cntr < 10\} \\ 0.99; & \{lt\_krts\_cntr = 0\} \end{cases}$$

The values of β in this equation is an experimentally derived weighting terms used to yield faster updating for the first 10 frames, and slower updating after the first 10 frames. lt_krts_cntr is a variable to track the frame count. This weighting can be omitted, or any suitable values can be used in other implementations. Voice regions are detected with Kurtosis as:

$$FT^2_{krts\_dsn} = \begin{cases} 1; & \{ma\_krts\_st^k \geq (ft^2_{krts\_th1} * ma\_krts\_lt^k)\} \\ 0; & \{otherwise\} \end{cases} \quad \text{Equation 22}$$

$$\text{wherein } ft^2_{krts\_th1} = 1.5$$

$ft_{krts\_th1}^2$ is an experimentally derived threshold in this example, although any suitable threshold is usable in other implementations. In this example, a final region determination is arrived at as:

$$VRD = \begin{cases} \text{Noise} + \text{Music}; \{FT^1_{dsn} == 0 \text{ AND } FT^2_{var_{dsn}} == 0 \text{ AND } FT^2_{krts_{dsn}} == 0\} \\ \text{Noise Only}; \{FT^1_{dsn} == 0 \text{ AND } FT^2_{var_{dsn}} == 0 \text{ AND } FT^2_{krts_{dsn}} == 1\} \\ \text{Music Only}; \{FT^1_{dsn} == 0 \text{ AND } FT^2_{var_{dsn}} == 1 \text{ AND } FT^2_{krts_{dsn}} == 0\} \\ \text{Voice Only}; \{FT^1_{dsn} == 0 \text{ AND } FT^2_{var_{dsn}} == 1 \text{ AND } FT^2_{krts_{dsn}} == 1\} \\ \text{Voice} + \text{Noise} + \text{Music}; \{FT^1_{dsn} == 1 \text{ AND } FT^2_{var_{dsn}} == 0 \text{ AND } FT^2_{krts_{dsn}} == 0\} \\ \text{Voice} + \text{Noise}; \{FT^1_{dsn} == 1 \text{ AND } FT^2_{var_{dsn}} == 0 \text{ AND } FT^2_{krts_{dsn}} == 1\} \\ \text{Voice} + \text{Music}; \{FT^1_{dsn} == 1 \text{ AND } FT^2_{var_{dsn}} == 1 \text{ AND } FT^2_{krts_{dsn}} == 0\} \\ \text{Voice Only}; \{FT^1_{dsn} == 1 \text{ AND } FT^2_{var_{dsn}} == 1 \text{ AND } FT^2_{krts_{dsn}} == 1\} \end{cases} \quad \text{Equation 23}$$

An example implementation of this decision is the output 495 in FIG. 4.

Figure 5:
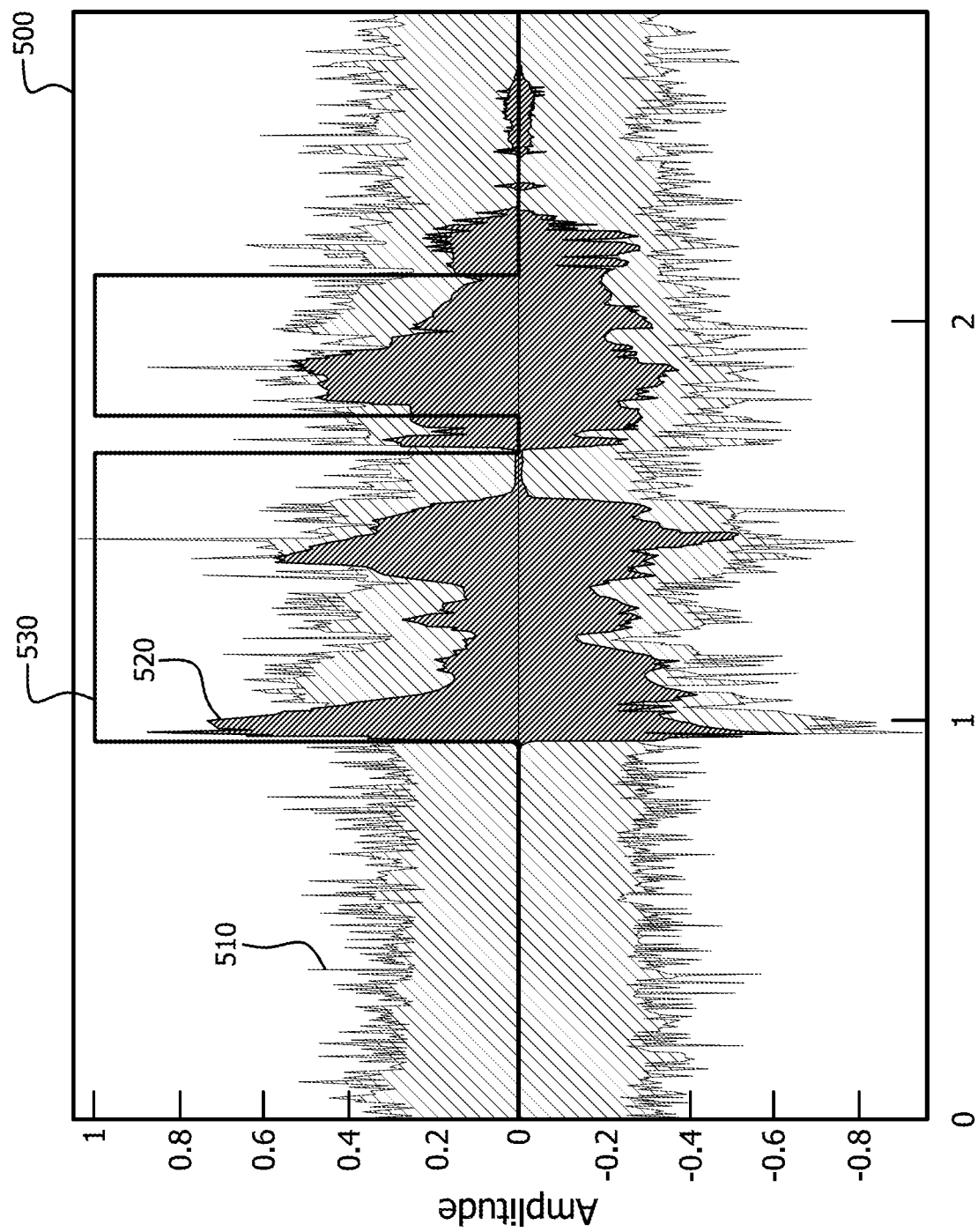
FIG. 5 is a graph illustrating example audio region detection according some implementations.
Figure 6:
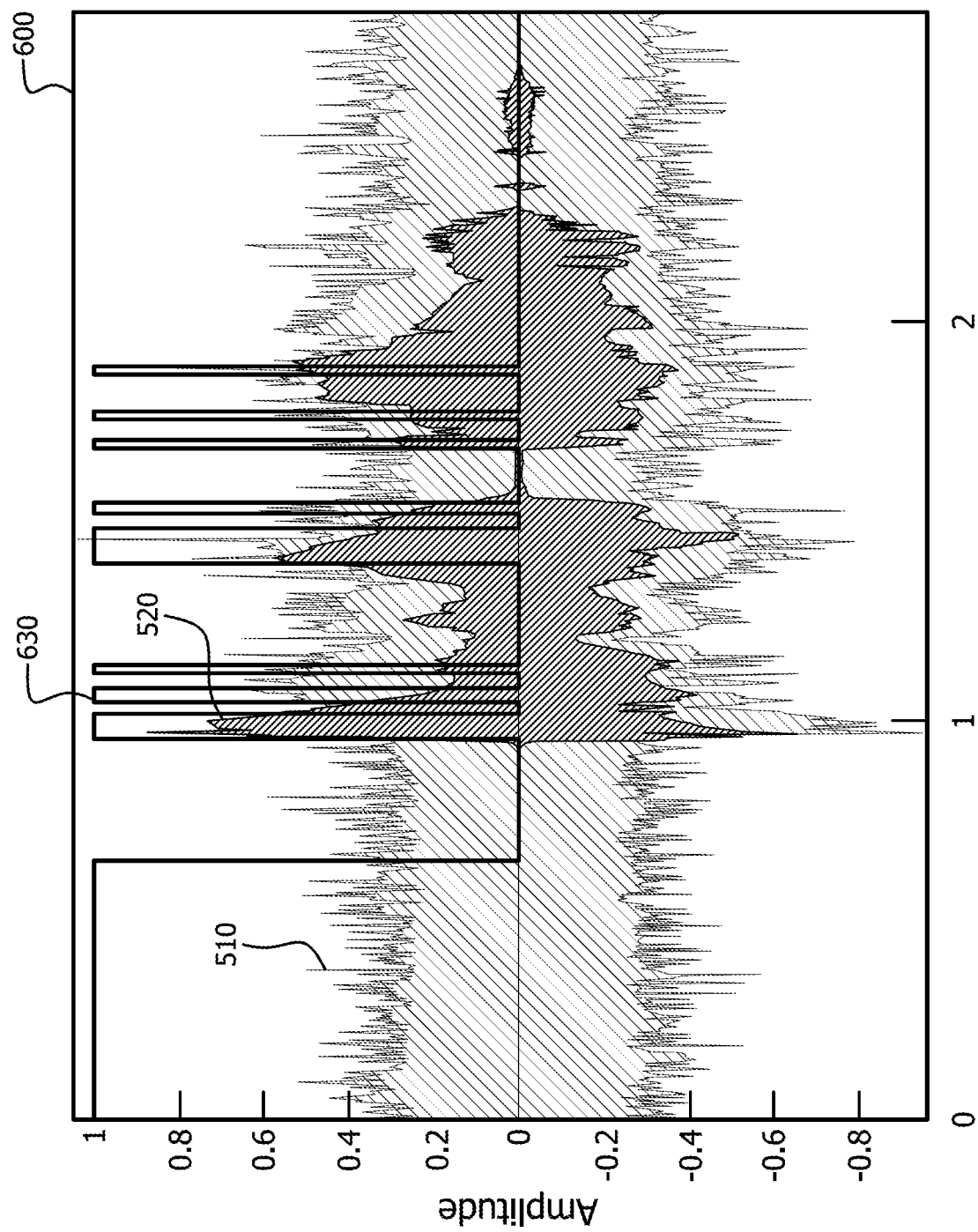
FIG. 6 is a graph illustrating example audio region detection according to existing techniques.

Systems, methods, and devices configured for VAD according to various techniques discussed herein have various advantages over prior approaches in some cases. For example, various techniques herein perform VAD according to characteristics of human voice speech, without the need to store prior speech or noise information, without the need to employ noise floor estimation, include sub-band analysis without bias (or with less bias) toward particular frequency bands, and in general provide higher performance than existing techniques. For example, FIG. 5 is a graph 500 illustrating an example input audio signal 510 which includes a voice region 520. VAD detection 530, according to various techniques discussed herein, reflects an extremely accurate detection of voice region 520. In contrast, FIG. 6 is a graph 600 illustrating the same input audio signal 510, which includes the same voice region 520. In this case however, VAD detection 630, according to existing techniques, provides very poor, intermittent detection of the voice region 520.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method implemented in a processing device for voice activity detection, the method being performed with at least one circuit, the method comprising:
   receiving an audio signal;
   performing a higher-order statistics analysis on the received audio signal to determine whether the audio signal includes a voice region, wherein the higher-order statistics analysis comprises estimating two higher order moments of a linear prediction (LP) residual of the received audio signal; and
   outputting an output signal indicating whether the audio signal includes the voice region based on the higher-order statistics analysis.

2. The method of claim 1, wherein the output signal indicates whether the received audio signal includes the voice region further based on a pitch analysis, and wherein the pitch analysis comprises analyzing sub-bands of the audio signal to determine whether energies of pitch harmonics of the audio signal exceed a threshold energy variance.

3. The method of claim 1, wherein the output signal indicates whether the received audio signal includes the voice region further based on a pitch analysis, and wherein the pitch analysis comprises determining whether the audio signal includes a pitch within a human voice range.

4. The method of claim 1, wherein the two higher-order moments are estimated by analyzing an LP residue of the audio signal to determine the LP residual.

5. The method of claim 4, wherein:
the estimated two higher-order moments include an estimated $2^{nd}$ moment variance and an estimated 4th moment kurtosis; and
the higher-order statistics analysis further comprises comparing the estimated $2^{nd}$ moment variance with a threshold $2^{nd}$ moment variance and comparing the estimated $4^{th}$ moment kurtosis with a threshold $4^{th}$ moment kurtosis.

6. The method of claim 1, wherein the output signal or a different output signal indicates whether the audio signal includes music, based on the estimated two higher-order moments.

7. The method of claim 1, wherein the output signal or a different output signal indicates whether the audio signal includes noise, based on the estimated two higher-order moments.

8. The method of claim 1, further comprising outputting the output signal to circuitry configured to control a digital signal processor (DSP).

9. A processor for voice activity detection, comprising:
one or more circuits configured to:
receive an audio signal;
perform a higher-order statistics analysis on the received audio signal to determine whether the audio signal includes a voice region, wherein the higher-order statistics analysis comprises estimating two higher order moments of a linear prediction (LP) residual of the received audio signal; and
output an output signal indicating whether the received audio signal includes the voice region, based on the higher-order statistics analysis.

10. The processor of claim 9, wherein the output signal indicates whether the received audio signal includes the voice region further based on a pitch analysis, and wherein the pitch analysis comprises analyzing sub-bands of the audio signal to determine whether energies of pitch harmonics of the audio signal exceed a threshold energy variance.

11. The processor of claim 9, wherein the output signal indicates whether the received audio signal includes the voice region further based on a pitch analysis, and wherein the pitch analysis comprises determining whether the audio signal includes a pitch within a human voice range.

12. The processor of claim 9, wherein the two higher-order moments are estimated by analyzing an LP residue of the audio signal to determine the LP residual.

13. The processor of claim 12, wherein:
the estimated two higher-order moments include an estimated $2^{nd}$ moment variance and an estimated $4^{th}$ moment kurtosis; and
the higher-order statistics analysis further comprises comparing the estimated $2^{nd}$ moment variance with a threshold $2^{nd}$ moment variance and comparing the estimated $4^{th}$ moment kurtosis with a threshold $4^{th}$ moment kurtosis.

14. The processor of claim 9, wherein:
the output signal or a different output signal indicates whether the audio signal includes music, based on the estimated two higher-order moments.

15. The processor of claim 9, wherein:
the output signal or a different output signal indicates whether the audio signal includes noise, based on the estimated two higher-order moments.

16. The processor of claim 9, wherein the output signal is output to circuitry configured to control a digital signal processor (DSP).

17. A digital signal processor (DSP) configured for voice activity detection, the DSP comprising:
circuitry configured to control whether speech processing circuitry of the DSP is active for an audio signal based on a signal from circuitry configured to perform a higher-order statistics analysis on the audio signal to determine whether the audio signal includes a voice region, wherein the higher-order statistics analysis comprises estimating two higher order moments of a linear prediction (LP) residual of the received audio signal.

18. The DSP of claim 17, wherein the circuitry is further configured to control whether the speech processing circuitry of the DSP is active further based on a pitch analysis, and wherein the pitch analysis comprises analyzing sub-bands of the audio signal to determine whether energies of pitch harmonics of the audio signal exceed a threshold energy variance.

19. The DSP of claim 17, wherein the circuitry is further configured to control whether the speech processing circuitry of the DSP is active further based on a pitch analysis, and wherein the pitch analysis comprises determining whether the audio signal includes a pitch within a human voice range.

20. The DSP of claim 17, wherein:
the two higher-order moments are estimated by analyzing an LP residue of the audio signal to determine the LP residual;
the estimated two higher-order moments include an estimated $2^{nd}$ moment variance and an estimated $4^{th}$ moment kurtosis; and
the higher-order statistics analysis further comprises comparing the estimated $2^{nd}$ moment variance with a threshold $2^{nd}$ moment variance and comparing the estimated $4^{th}$ moment kurtosis with a threshold 4th moment kurtosis.

* * * * *